United States Patent
Suvanen et al.

(10) Patent No.: US 6,681,253 B1
(45) Date of Patent: Jan. 20, 2004

(54) ADAPTIVE PROCESSOR SYSTEM

(75) Inventors: Jyri Suvanen, Helsinki (FI); Jari Korhonen, Karjaa (FI); Matti Lehtimäki, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/486,492

(22) PCT Filed: Sep. 22, 1998

(86) PCT No.: PCT/FI98/00741

§ 371 (c)(1),
(2), (4) Date: May 17, 2000

(87) PCT Pub. No.: WO99/15983

PCT Pub. Date: Apr. 1, 1999

(30) Foreign Application Priority Data

Sep. 23, 1997 (FI) ................................................. 973761

(51) Int. Cl.$^7$ .............................................. G06F 15/16
(52) U.S. Cl. ..................... 709/230; 709/204; 709/105; 709/217; 709/219; 709/226; 709/229; 700/2; 700/5
(58) Field of Search ............................... 709/230, 224, 709/217, 226, 229, 223, 104–105, 219–221; 370/385, 352, 431; 379/269; 700/5, 2; 707/8

(56) References Cited

U.S. PATENT DOCUMENTS

| | | | |
|---|---|---|---|
| 5,005,122 A | | 4/1991 | Griffin et al. |
| 5,421,009 A | | 5/1995 | Platt |
| 5,504,670 A | * | 4/1996 | Barth et al. |
| 5,546,453 A | | 8/1996 | Hebert |
| 5,600,643 A | | 2/1997 | Robrock, II |
| 5,958,010 A | * | 9/1999 | Agarwal et al. |
| 5,970,488 A | * | 10/1999 | Crowe et al. |
| 5,999,990 A | * | 12/1999 | Sharrit et al. ................... 710/8 |
| 6,021,442 A | * | 2/2000 | Ramanan et al. ........... 709/238 |
| 6,061,442 A | * | 5/2000 | Bhat |
| 6,104,721 A | * | 8/2000 | Hsu |
| 6,163,535 A | * | 12/2000 | Jordan et al. |
| 6,195,678 B1 | * | 2/2001 | Komuro ..................... 709/202 |
| 6,199,093 B1 | * | 3/2001 | Yokoya ..................... 709/102 |
| 6,208,642 B1 | * | 3/2001 | Balachandran et al. |
| 6,226,263 B1 | * | 5/2001 | Iwase et al. ................ 370/231 |
| 6,240,086 B1 | * | 5/2001 | Morgan et al. |
| 6,298,120 B1 | * | 10/2001 | Civanlar et al. ......... 379/88.17 |
| 6,421,338 B1 | * | 7/2002 | Byers et al. ................ 370/352 |

FOREIGN PATENT DOCUMENTS

| | | |
|---|---|---|
| EP | 0 504 860 A2 | 9/1992 |
| EP | 0 790 751 A2 | 8/1997 |
| WO | 97/03527 | 1/1997 |

* cited by examiner

Primary Examiner—Hosain T. Alam
Assistant Examiner—Oanh Duong
(74) Attorney, Agent, or Firm—Pillsbury Winthrop LLP

(57) ABSTRACT

An arrangement and method for executing different applications associated with several connections using at least one processing unit is provided. The arrangement includes a controller and a database that has several applications. The at least one processing unit and the controller are connected to the database. The controller allocates an available processing unit for each connection at the beginning of the connection, identifies the applications required by the connection concerned, and loads the applications from the database to the allocated processing unit.

23 Claims, 1 Drawing Sheet

ADAPTIVE PROCESSOR SYSTEM

This application is the national phase of international application PCT/FI98/00741 filed Sep. 22, 1998 which designated the U.S.

BACKGROUND OF INVENTION

The invention relates to processor systems used in the network elements of telecommunication systems, and particularly to allocation and configuration of resources to digital signal processors (dsp).

With reference to FIG. 1, a digital signal processing unit DSPU serving a connection 11 typically comprises, in addition to the actual processor (DSP), an interface I/O (Input/Output) to the connection, and program memory, which usually comprises read-only memory ROM and random-access memory RAM (and other supporting circuits, such as a clock and interrupt circuits, which are not, however, relevant to the invention). The connection 11 is divided into two parts: the part on which actual information is transmitted is indicated by $11_1$ and the associated signalling is indicated by $11_2$.

A problem in a system of this kind is that the configuration is inflexible. If there are several processor units DSPU and if different applications are executed by them, the program memory ROM of each processor unit must be sufficiently large to store all the applications. The applications include, for example, different speech coding methods, methods of compressing and decompressing a video signal, echo cancellation, etc. Since in the prior art the applications are installed either permanently or semi-permanently (e.g. in rewritable ROM), the known processor units do not comprise a fast interface for updating the application. Consequently, another problem arises: when an application is being updated, the processor unit is out of use.

In order that not all the applications would be needed in all the processor units, the processor units are typically arranged in pools. The data streams that need a particular application are conducted to the pool serving the application concerned. The problem is that the pools are permanent, so the distribution of different data streams cannot be taken into account.

BRIEF DESCRIPTION OF INVENTION

The object of the invention is to provide a method and an arrangement implementing the method, solving the above problems. The object of the invention is achieved by a method and a system that are characterized by what is stated in the independent claims. The preferred embodiments of the invention are claimed in the dependent claims.

The basic idea of the invention is to use a broadband packet-switched telecommunication network, preferably an ATM network, for transferring applications from a common database of a multiprocessor system to processing units at least at the beginning of each connection and, if necessary, again during the connection. Preferably, the protocol of the ATM network is used, and no conversion to the higher-level protocols of the OSI model is needed.

A first embodiment of the claimed method and arrangement is based on arranging several processing units under a common control unit. The applications are concentrated on a common database. In each connection, the applications (services) required by the connection are identified and subsequently loaded, under control of the control unit, to an available processing unit. The processing unit and the database containing the applications are interconnected using fast connecting technology, preferably a broadband packet network, such as the ATM. Here the fast connecting technology means that an application can be loaded from the database to the processing unit during the connection, without that the user using the connection notices any disturbing delay.

The technology of the invention leads to flexible use of the resources, since in each processing unit memory is needed only to store the largest application (or set of applications). Not all the applications need thus to be stored in the memory. Any processing unit whatsoever can serve any connection whatsoever, since all the applications are available to all the processors. The suitable amount of memory in each processing unit is slightly greater (e.g. 30 to 100%) than the greatest amount of memory needed at a time or the amount of memory required by the largest single application or set of applications, but yet considerably smaller than the combined amount of memory required by the different applications. A set of applications means applications associated with one and the same connection at a time. In the GSM, for example, a set of applications could comprise a full-rate codec and echo cancellation.

The technology of the invention is also reliable in respect of modifications and updating. When an application is updated, the older version of the application can be retained although a newer version is loaded to the database. If the new application does not work properly, the older version can then be immediately put to use. When applications are updated, none of the processing units is out of use. Since the loading of all the applications of all the connections is controlled by the common controller, a further advantage is achieved: the number of times that each application is used can be easily counted, if the operator wants to prepare statistics or if the supplier of the applications wants to charge for the number of times of use, rather than a lump sum.

A second embodiment of the method and arrangement of the invention is a compromise between the prior art (in which the applications are located in permanent memories) and the first embodiment of the invention (in which the applications are loaded separately for each connection). The compromise is achieved, for example, by keeping track of available processing units and of what applications have been loaded in which processing units. At the beginning of each connection (and, where necessary, also during the connection), the applications required by the connection concerned are identified, and an available processing unit to which as large a part as possible of the applications required has been loaded is selected for the connection. The missing applications are then loaded to the processing unit from the database.

The definition 'as large a part as possible' can be interpreted in at least two ways: either as few applications as possible need to be loaded to the selected processing unit, or an application (set of applications) that is as small as possible needs to be loaded. If one processing unit can serve several connections, then the 'available processing unit' is here a unit that has at least some processing capacity available.

Apart from the above advantages, the second embodiment also has the advantage that if the necessary applications have already been loaded to one processing unit, no applications need be loaded to the processing units. This is particularly useful to the network operator in distributed systems, in which the database and the processing units are a long distance apart, and in which the operator also has to pay for the network capacity reserved for transferring the applications.

Although the maximum advantage is achieved by the invention when there are several processing units, the technology of the invention can also be applied when there is only one processing unit, if the number of the processing units can be expected to rise (e.g. as the traffic load increases). If there is only one processing unit, the selecting of an available processing unit simply means that it is checked whether all the capacity of the processing unit is already in use.

BRIEF DESCRIPTION OF DRAWINGS

In the following the invention will be described in greater detail by means of preferred embodiments and with reference to the attached drawings, in which.

DETAILED DESCRIPTION OF INVENTION

Figure 2:
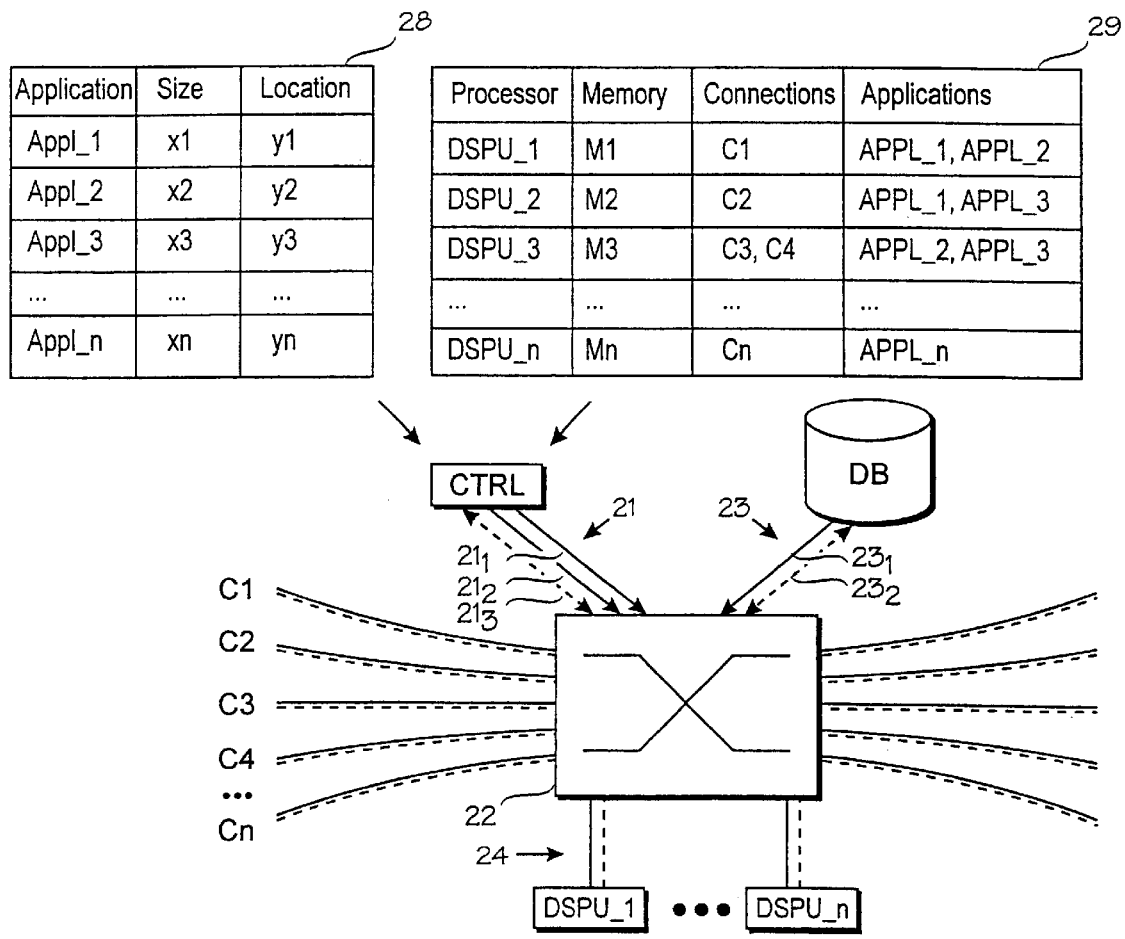
FIG. 2 is a block diagram of an arrangement according to the present invention.

The arrangement according to the second embodiment of the invention illustrated in FIG. 2 comprises a database DB to which the applications are loaded, and a control unit or controller CTRL, as well as processing units DSPU. The arrangement also comprises a broadband transmission path that combines the different blocks, the path being preferably an ATM switch system 22. The database DB comprises, i.e. in the database are stored, all the applications to be executed in the arrangement (different coding algorithms, etc.). It is possible to keep track of the applications contained in the database DB, for example, by means of a table 28, which shows, for each application, at least an identifier Appl_1 to Appl_n and the size of the application, i.e. the amount of memory required by the application. The table may also indicate the location of each application in the database (unless the database DB accepts the identifier Appl_1 to Appl_n of the application as such as an indication of the application concerned). The table can also be used to maintain the version number of the applications.

Figure 1:
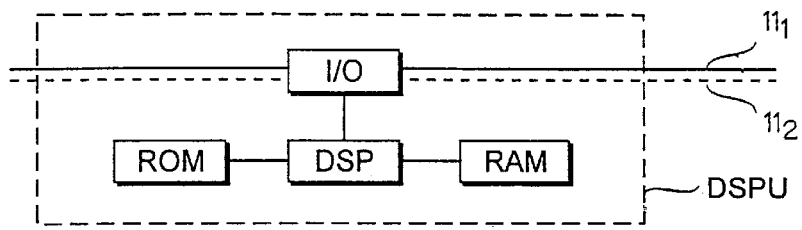
FIG. 1 is a block diagram of a previously known digital processing unit.

The processing units DSPU substantially correspond to the previously known processing unit illustrated in FIG. 1, but read-only-memory ROM is here needed only to transfer applications from the database DB via the switch system 22. The ROM thus mainly corresponds to an initial, or bootstrap, loader of a common computer. The loading of an application from the database to the processing units takes place at an optimal rate if the protocol of the network itself (e.g. ATM network) can be used and no time nor resources need to be wasted on converting the protocols to the higher-level protocols (e.g. TCP/IP) of the OSI model. However, it is advisable to supplement the protocol of the ATM network with error detection and retransmission in case a packet is lost or distorted.

The resource management is controlled by the controller CTRL. Reference number 21 indicates an interface between the controller CTRL and the switch system 22, and the interface comprises a control connection $21_1$ for controlling the switch system 22, Operation And Management OAM $21_2$, and a signalling connection $21_3$. At the beginning of each connection, the controller CTRL identifies the applications needed by each connection C1 to Cn, for example on the basis of the signalling connection associated with the connection. The identification of the applications needed by a connection is a standard procedure for a person skilled in the art, and in the prior art arrangements an available processing unit whose software comprises the application required would be allocated for the connection on the basis of the identification. According to the first embodiment of the invention, all the processing units are equal, and the controller CTRL allocates any available processing unit DSPU whatsoever for the connection concerned. According to the second embodiment of the invention, the controller checks whether the necessary applications have been loaded to an available processing unit. The controller then initiates the loading of any necessary applications from the database DB to the processing unit serving the connection concerned. Reference number 23 indicates an interface between the database DB and the switch system, and the interface comprises a broadband transmission path $23_1$ for loading applications via the switch system 22 to the processing units $DSPU_1$ and a signalling connection $23_2$, through which the controller CTRL notifies the database what applications are to be loaded to which processing units.

The controller CTRL can maintain information on the allocation of the processing units, for example by means of a table 29, which shows, for each processing unit, the amount of memory (unless the amount is the same for all the processing units), the connections that the unit serves and the applications it contains. Let us now presume that in FIG. 2 each processing unit can serve two connections, and a need arises to serve a new connection which needs applications Appl_2 and Appl_3. Processing unit DSPU3 has the applications stored in its memory, but all its processing capacity has already been allocated. Processing unit DSPU1 lacks application Appl_3, and processing unit DSPU2 lacks application Appl_2. If Appl_3 is presumed to require less memory than Appl_2, the least amount of loading is heeded if DSPU1 is allocated for the new connection and Appl_3 is loaded thereto. (The table 28 of FIG. 2 is, in fact, a simplified presentation: the size of an application in the database DB is not always the same as the total amount of memory required by the application. In reality, the applications also require data memory, i.e. working space, the amount of which must be taken into account in the memory management of the processing units but which need not be loaded to the processing units.) If there is not enough space in the RAM of the processing unit for the new applications to be loaded, the controller can command the processing unit to delete from the memory an application that is not needed at that moment. Alternatively, it is possible to check whether there is enough space for the application to be loaded in the memory of some other processing unit.

The controller CTRL can load the application from the database DB one block at a time and subsequently forward it to the processing unit DSPU. Alternatively, if the database DB and the processing units DSPU are sufficiently independent, the controller CTRL can start the transfer of the application directly from the database to the processing unit.

The switch system 22 and the controller CTRL can be otherwise conventional parts of the ATM switch system, but the controller CTRL is supplemented with the operations described above. The controller CTRL is preferably implemented using a digital processor. The programs of the controller can be located either in the controller itself or in the database DB, from which the controller retrieves them when it is activated and/or when it detects (on the basis of the signalling connection $21_3$) that the software has been updated.

The controller CTRL and the database DB are shown as separate units. The division is rather a logical than a physical one, and it helps to clarify the functions performed in the arrangement of the invention. FIG. 2 could also be drawn to show the two elements combined, whereby it would be possible to talk about an 'intelligent database.'

The blocks of FIG. 2 can be located in one and the same network element. An example for such an element could be a base station controller or a transcoder unit of a mobile system, or a video-on-demand server. Since the arrangement according to the invention enhances the utilization of the resources, the maximum advantage is achieved if as large a number of applications as possible, for example different coding techniques and echo cancellation, are concentrated on one and the same arrangement.

An alternative to the above compact arrangement would be geographical distribution of the blocks of FIG. 2, for example, in such a way that the common controller and database would serve a large number of processing units located a long distance apart. A preferred arrangement is that the equipment supplier maintains the database DB, but the operator stores the corresponding applications in its cache memory. In the arrangement of FIG. 2 the cache could be located along connection 23 (or 21). This is a relatively simple way of providing redundancy: one secured database serves all the processing units of a network or a part of the network. This also allows the network elements to 'borrow' processing units from one another during peak traffic.

The above first embodiment of the invention can thus be implemented by providing a database DB that comprises several applications and by arranging a fast interface 22, 23, 24 between the processing units and the database DB. At the beginning of each connection, an available processing unit is allocated for the connection, the applications required by the connection concerned are identified, and the applications are loaded to the allocated processing unit from the database DB.

Correspondingly, the second embodiment of the invention (in which the applications are loaded where necessary) can be implemented by a method comprising the steps of:

(1) forming a database DB that comprises several applications Appl_1 to Appl_n and arranging a fast interface 22, 23, 24 from the database to processing units DSPU_1 to DSPU_n so as to load applications to them;

(2) keeping track of available processing units and of what applications have been loaded to the processing units; and at least at the beginning of each connection, (3) identifying the applications required by the connection concerned, (4) allocating an available processing unit for the connection concerned, preferably one to which as large a part as possible of the applications required by the connection concerned is loaded, and (5) if the processing unit concerned lacks any of the applications required by the connection concerned, loading the application to it from the database DB.

The identification of the necessary applications and the loading of the applications to the processing units DSPU can also take place later during the connection. For example, the terminal equipment units of the mobile system can change the speech coding method or negotiate about the use of an echo canceller during the connection (especially when they change cells). The controller CTRL detects this (e.g. on the basis of the signalling connection) and repeats steps (3) to (5). The repetition of the steps can be interpreted in at least two ways. According to the first interpretation, a processing unit allocated for the connection is not changed during the connection, but any additional applications needed are loaded to the processing unit that has been allocated at the beginning of the connection. According to the second interpretation, the allocation of a processing unit taking place in step (4) can also be repeated during the connection. If, for example, the terminals decide to transfer from a full-rate codec to a half-rate codec and there is available at least one processing unit to which a half-rate codec has been loaded, then the controller CTRL can assign this processing unit to serve the connection concerned.

With technical advances, it will be obvious to a person skilled in the art that the basic idea of the invention can be implemented in various ways. The invention and its embodiments are thus not limited to the above examples but can vary within the scope of the claims.

What is claimed is:

1. A method of executing at least one application associated with a telecommunications connection by at least one processing unit, the method comprising:

(i) forming a database that comprises several applications and operationally connecting the database to the at least one processing unit via a fast packet-switched network so as to load applications to the at least one processing unit;

(ii) allocating an available processing unit of the at least one processing unit for the telecommunications connection in question;

(iii) identifying the applications required by the telecommunications connection in question; and (iv) loading the applications required by the telecommunications connection in question to the allocated processing unit from said database via said fast packet-switched network using the protocol of the network without conversion to higher-level protocols.

2. A method of executing at least one application associated with a connection by at least one processing unit, the method comprising:

(1) forming a database that comprises several applications and operationally connecting the database to the at least one processing unit via a fast packet-switched network so as to load applications to the at least one processing unit;

(2) tracking available processing units and the applications loaded to the at least one processing unit;

(3) identifying applications required by the connection concerned;

(4) allocating an available processing unit for the connection concerned, preferably one to which as large a part as possible of the applications required by the connection concerned has been loaded; and (5) if the processing unit allocated lacks any of the applications required by the connection concerned, loading the missing applications thereto from said database via said fast packet-switched network using the protocol of the network without conversion to higher-level protocols.

3. A method according to claim 1, wherein the applications are loaded to the processing unit via the same interface through which the information associated with said connection is transferred to the processing unit.

4. A method according to claim 1, loading the applications to the processing unit via an ATM network.

5. A method according to claim 1, further comprising re-conducting steps (ii) to (iv) or, respectively, (2) to (5) during the connection if necessary.

6. A method according to claim 1, further comprising controlling steps (ii) to (iv) or, respectively, (2) to (5) by a separate controller common to all the processing units.

7. An arrangement for executing at least one application associated with a telecommunications connection by at least one processing unit, the arrangement comprising:

a controller and a database that contains several different applications;

a fast packet-switched network arranged from the processing units to said database;

the controller being arranged to allocate, at least at the beginning of each telecommunications connection, an available processing unit for the telecommunications connection concerned, and the controller being arranged to identify the applications required by the telecommunications connection concerned, and to load them to the allocated processing unit from said database via said fast packet-switched network using the protocol of the network without conversion to higher-level protocols.

8. An arrangement for executing at least one application associated with a connection by at least one processing unit, the arrangement comprising:

a controller and a database that contains several different applications;

a fast packet-switched network arranged from the processing units to said database; and the controller being arranged to keep track of available processing units and of what applications have been stored in the processing units;

at least at the beginning of each connection, the controller is arranged to identify the applications required by the connection concerned;

allocate an available processing unit for the connection concerned, preferably one to which as large a part as possible of the applications required by the connection concerned has been loaded; and if the processing unit allocated lacks any of the applications required by the connection concerned, load the missing applications thereto from said database via said fast packet-switched network using the protocol of the network without conversion to higher-level protocols.

9. An arrangement according to claim 7, wherein the controller is common to all the processing units.

10. An arrangement according to claim 7, wherein each processing unit comprises memory, the amount of memory being greater than the greatest amount of memory required by the applications associated with a single connection, yet notably smaller than the combined amount of memory required by the applications of the arrangement.

11. An arrangement according to claim 7, wherein the connection, the controller, the database, the fast packet-switched network, and the at least one processing unit are located in one and the same network element.

12. An arrangement according to claim 7, wherein not all of the connection, the controller, the database, the fast packet-switched network, and the at least one processing unit are located in one and the same network element.

13. An arrangement according to claim 7, wherein said fast packet-switched network is formed via an ATM network.

14. A telecommunication method comprising:

allocating, at least at the beginning of each telecommunications connection, an available processing unit for the telecommunications connection concerned;

identifying the applications required by the telecommunications connection concerned; and transferring the required applications from a database to a the available processing unit using a broadband packet-switched telecommunication network during a telecommunications connection, the transfer being performed using a protocol of said packet-switched telecommunication network, substantially without any conversion to higher-level protocols.

15. A method according to clam 2, wherein the applications are loaded to the processing unit via the same interface through which the information associated with said connection is transferred to the processing unit.

16. A method according to claim 2, loading the applications to the processing unit via an ATM network.

17. A method according to claim 2, further comprising re-conducting steps (ii) to (iv) or, respectively, (2) to (5) during the connection if necessary.

18. A method according to claim 2, further comprising controlling steps (ii) to (iv) or, respectively, (2) to (5) by a separate controller common to all the processing units.

19. An arrangement according to claim 8, wherein the controller is common to all the processing units.

20. An arrangement according to claim 8, wherein each processing unit comprises memory, the amount of memory being greater than the greatest amount of memory required by the applications associated with a single connection, yet notably smaller than the combined amount of memory required by the applications of the arrangement.

21. An arrangement according to claim 8, wherein the connection, the controller, the database, the fast packet-switched network, and the at least one processing unit are located in one and the same network element.

22. An arrangement according to claim 8, wherein not all of the connection, the controller, the database, the fast packet-switched network, and the at least one processing unit are located in one and the same network element.

23. An arrangement according to claim 8, wherein said fast packet-switched network is formed via an ATM network.

* * * * *